United States Patent [19]

Tseng et al.

[11] Patent Number: 5,354,823
[45] Date of Patent: Oct. 11, 1994

[54] FILMS AND EXTRUSIONS OF CURED CROSSLINKED VINYL LACTAM POLYMER AND METHOD OF PREPARATION

[75] Inventors: Susan Y. Tseng, Staten Island, N.Y.; Philip F. Wolf, Bridgewater; William J. Burlant, Wayne, both of N.J.

[73] Assignee: ISP Investments Inc., Wilmington, Del.

[21] Appl. No.: 103,944

[22] Filed: Aug. 9, 1993

[51] Int. Cl.$^5$ .................... C08F 26/10; C08F 26/06
[52] U.S. Cl. .................... 526/264; 525/326.9; 526/258; 526/259; 526/262; 526/263; 526/317.1
[58] Field of Search ............ 526/264; 525/326.9

[56] References Cited

U.S. PATENT DOCUMENTS

| | | | |
|---|---|---|---|
| 3,661,634 | 5/1972 | Riley | 117/161 UA |
| 3,941,718 | 3/1976 | Barabas | 252/430 |
| 3,993,072 | 11/1976 | Zaffaroni | 128/260 |
| 4,866,148 | 9/1989 | Geyer | 526/264 |
| 5,073,614 | 12/1991 | Shih | 526/258 |
| 5,130,388 | 7/1992 | Shih | 526/228 |
| 5,139,770 | 8/1992 | Shih | 424/59 |

*Primary Examiner*—Fred Zitomer
*Attorney, Agent, or Firm*—Marilyn J. Maue; Joshua J. Ward

[57] ABSTRACT

This invention relates to a continuous film, coating, membrane or extruded filament of a crosslinked vinyl lactam polymer having excellent substrate adhesion, a glass transition temperature (Tg) above 150° C. and water repellent properties. The invention also relates to the method of preparing and using filaments, coatings and membranes of said crosslinked polymeric product.

8 Claims, No Drawings

FILMS AND EXTRUSIONS OF CURED CROSSLINKED VINYL LACTAM POLYMER AND METHOD OF PREPARATION

BACKGROUND OF THE INVENTION

Crosslinked vinylpyrrolidone polymeric powder has been prepared by proliferous polymerization at high temperatures with vigorous agitation as described for example in copending patent application Ser. No. 057,378, filed May 6, 1993 for COLORLESS, PURIFIED, POLYMERIZABLE COMPOSITION USEFUL FOR THE PRODUCTION OF CROSSLINKED POLYVINYLPYRROLIDONE. U.S. Pat. Nos. 5,082,910; 5,130,388 and 5,015,708 also describe processes for crosslinking vinyl lactam polymers. However, the powder products obtained by these processes are not amenable to extrusion or to the formation of membranes or continuous, thin film protective coatings.

Accordingly, it is an object of this invention to provide a curable crosslinked vinyl lactam polymer in the form of a filament or film which is coated on a substrate or extruded to form a product having a high Tg and water repellency.

Another object of the invention is to provide micro-thin protective coatings which have superior adhesion to a substrate.

Still another object is to provide an economical and commercially feasible process for preparing the film or filament products of a crosslinked vinyl lactam polymer hydrogel.

Yet another object is to provide a strong, adhesive membrane which is non-irritating to the skin and which can be used to cover wounds and the like.

These and other objects of this invention will become apparent from the following description and disclosure.

THE INVENTION

The crosslinked polymeric products of this invention are prepared by
(1) forming a uniform liquid mixture of
(a) between about 2 and about 30 wt. % of a polymerizable reactant containing at least 55% N-vinyl lactam monomer;
(b) between about 0.01 and about 10.0 wt. % crosslinking agent and
(c) between about 60 and about 90 wt. % water;
(2) reacting in an inert atmosphere the mixture in the presence of a polymerization initiator with agitation by heating the mixture to between about 50° and about 80° C. for a period of from about 2 to about 5 hours and until a constant viscosity of from about 60 to about 100K value is obtained;
(3) applying a coating of the resulting soluble polymer solution as a film to a substrate or extruding the soluble polymer in the form of a filament;
(4) subjecting said film or filament to curing in a closed system in an inert atmosphere at a temperature of from about 100° to about 140° C. for a period of from about 0.5 to 3 hours to produce a transparent, water insoluble crosslinked product and then
(5) digesting the film or filament in water to swell the polymer, extract soluble monomer, linear polymer and residuals and to form a hydrogel.

The hydrogel product of this invention is derived from the homopolymerization or copolymerization of N-vinyl pyrrolidone and/or N-vinyl caprolactam which is between about 0.01 and about 10% crosslinked, preferably between about 0.2 and about 5% crosslinked, with a suitable polyfunctional crosslinking agent.

As indicated, the N-vinyl lactam monomer may be combined with a polymerizable comonomer, preferably in an amount not more than 30% comonomer. Suitable comonomers are those which are soluble in the reaction solvent and include olefinically unsaturated compounds such as another N-vinyl amides having the structure $CH_2=CH-NR_1CO-R_2$, where $R_1$ and $R_2$ are individually hydrogen or lower alkyl, e.g. vinyl formamide, vinyl acetate, etc., N,N-dimethylamino $C_1$ to $C_4$ alkyl acrylate or methacrylate, vinyl acetate, acrylic acid, methacrylic acid, styrene, acrylamide, methacrylamide, lower alkyl acrylates or methacrylates, hydroxyalkyl acrylates or methacrylates, isobutylene, acrylonitrile, vinyl chloride, hydroxyalkyl acrylates or methacrylates, ethyl vinyl ether, vinyl ether, quaternized dimethylamino lower alkyl acrylates or methacrylates and the like.

Representative of the crosslinking agents which can be employed are diallylimidazolidone; the divinyl ether of diethylene glycol; pentaerythritol triallyl ether (PETE); triallyl-1,3,5-triazine-2,4,6-(1H,3H,5H)trione (TATT); ethylene glycol diacrylate; 2,4,6-triallyloxy-1,3,5-triazine; N-vinyl-3(E)-ethylidene pyrrolidone (EVP); 1,7-octadiene; 1,9-decadiene; divinyl benzene; methylene bis(methacrylamide); methylene bis(acrylamide); N,N-divinyl-imidazolidone; ethylene glycol diacrylate; ethylene bis(N-vinylpyrrolidone) (EBVP); etc.

*as described in copending U.S. patent application Ser. No. 08/025,523; filed Mar. 3, 1993, now U.S. Pat. No. 5,274,120; entitled 1-VINYL-3(E)-ETHYLIDENE PYRROLIDONE, in which EVP is defined by the formula:

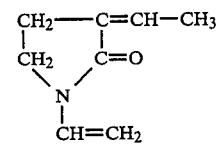

Preferred products of this invention are those derived from N-vinyl pyrrolidone homopolymer, N-vinyl pyrrolidone/N-vinyl caprolactam copolymer or N-vinyl pyrrolidone/acrylic acid copolymer which are crosslinked with EVP, EBVP or N,N-divinylimidazolidone. Most preferred is the EVP crosslinked N-vinyl pyrrolidone homopolymer.

Any of the conventional free radical initiators can be employed in the present process. Preferably, the initiator is an organic peroxide such as t-butyl peroxy pivalate, t-amylperoxy pivalate, a diacyl peroxide or mixtures thereof.

Water, preferably pure, deionized water is employed as the solvent in the system and although the solvent can vary over a wide range; between about 65% and 75% of the reaction mixture is usually sufficient to dissolve all reactive components. If desired, a small amount, e.g. between about 0.001 and about 1.0 wt. %, of an antiseptic, drug or coloring agent can be added to the monomeric component, the solvent or to the water wash in step 5 of the process.

Digestion of the cured polymer in between about 1 and about 500 volumes of water takes place at ambient temperature for a period of from about 2 hours to about 2 days, preferably between about 50 and about 150 volumes of water for a period of from about 10 to about 24 hours. This step can be carried out with incremental or continuous addition and replacement of water.

The mechanical strength of the hydrogel can be varied within an acceptable range by regulating the concentrations of reactive monomer(s) and/or crosslinking agent in the initial uniform mixture before casting. Hence, the mechanical strength varies directly with the amount of monomer and/or crosslinker in the system.

The non-crosslinked soluble polymer obtained in step (2) contains between about 20 and about 98 wt. % water and between about 0 and about 20 wt. % innocuous additive or a material which is chemically inactive in the polymerization, e.g. antiseptic, drug, colorant, and the like, which additives can be added to the feed mixture.

Upon curing to crosslink the coated or extruded polymer at from about 100° to about 140° C., a transparent product is obtained which is water-insoluble and water swellable. This product is suitably employed as a protective coating over wires for rust resistance, over wood or metal decks or painted surfaces, as a moisture or fog repellent coating over glass, as a water repellent coating on a fabric, etc. since it displays superior adhesion to glass, metal, ceramic, plastic, fabric and wood surfaces.

Having generally described the invention, reference is now had to the following examples which illustrate preferred embodiments concerning the preparation and use of the present formed products, which examples are not to be construed as limiting to the scope of the invention as more broadly defined above and in the appended claims.

EXAMPLE 1

A. An aqueous solution of 40 g. of N-vinylpyrrolidone, 0.16 g. of 1-vinyl-3(E)-ethylene pyrrolidone crosslinking agent, 0.52 g. of t-butylperoxy pivalate initiator and 460 g. of water were charged to a nitrogen purged Buchi glass reactor equipped with an oxygen analyzer for maintaining an oxygen level below 20 ppm. The reactor was sealed under a 0.14 bar nitrogen pressure and the contents heated to 75° C. with agitation at about 150 rpm. Reaction was indicated by an increase in viscosity and the viscosity (torque) changes were recorded. After about 1 hour, the resulting soluble polymer solution containing about 1.8% vinyl pyrrolidone monomer and no remaining crosslinking agent was discharged.

B. The soluble polymer solution obtained above was then coated in a thickness of about 25 microns on an aluminum panel and the coated panel placed in an oxygen evacuated vacuum oven wherein, under a vacuum of −25 mm Hg at 115° C. the coating is cured over a period of 1.5 hours. Upon cooling the cured, coated panel was soaked in a constant steam of distilled water for 16 hours so as to swell the polymer, extract and remove unreacted monomer, non-crosslinked polymer and other residuals in the water phase and to form a firm hydrogel coating. The panel was then dried in air. The resulting panel was covered with a stable, highly adhesive, corrosion resistant water insoluble coating.

Repetition of the above example, except for the substitution of a glass plate for the aluminum panel, provided a product having the same strong substrate adhesion and water repellency. Also, it was noted that the coated glass resisted fogging when exposed to 80% humidity for a period of 2 hours.

EXAMPLE 2

Part A of Example 1 was repeated except that only 25 grams of N-vinyl pyrrolidone was used. The soluble polymer product in solution was extruded from a syringe into a hot, nitrogen purged oven on a stainless steel surface. In the oven, the extruded filaments were heated at 120° C. for about 2 hours, then cooled and soaked in a bath of distilled water for 16 hours to swell the polymer and to extract monomer, non-crosslinked polymer and other residuals. The resulting water insoluble filaments were then dried in air. The hydrogel filaments of this example can be woven and then dried to produce a synthetic water resistant fabric.

EXAMPLE 3

Part A of Example 1 was repeated and the soluble polymer product in solution was coated in a thickness of about 30 microns on a gauze fabric. The coated fabric was then cured in the vacuum oven and subjected to treatment as described in Example 1 part B.

The air dried coated gauze is suitable as a bandage and can be further enhanced by incorporating between about 1 and about 10% of an antiseptic in the initial feed reaction mixture.

It is to be understood that many modifications and variations in the above examples within the scope of this invention will become apparent from the preceding disclosure.

What is claimed is:

1. A cured, 0.01–10 wt. % crosslinked N-vinyl lactam polymer consisting of 70–100 wt. % N-vinyl lactam monomer and 0–30 wt. % acrylic acid monomer units in the form of a continuous membrane or filament having a high glass transition temperature (Tg) above 150° C.

2. The polymer of claim 1 wherein said vinyl lactam polymer is N-vinylpyrrolidone homopolymer which is 0.01 to 10% crosslinked.

3. The polymer of claim 1 wherein said vinyl lactam polymer is N-vinyl caprolactam homopolymer which is 0.1 to 51% crosslinked.

4. The polymer of claim 1 wherein said vinyl lactam polymer is N-vinylpyrrolidone/N-vinyl caprolactam copolymer which is 0.01 to 5% crosslinked.

5. The polymer of claim 1 wherein said vinyl lactam polymer is a polymer of acrylic acid and N-vinylpyrrolidone and/or N-vinyl caprolactam and the polymer is 0.1 to 5% crosslinked.

6. The polymer of claim 1 wherein the vinyl lactam polymer is crosslinked with N-vinyl-3-(E)ethylidene pyrrolidone.

7. The polymer of claim 1 wherein the vinyl lactam polymer is crosslinked with ethylene bis(N-vinylpyrrolidone).

8. The polymer of claim 1 wherein the vinyl lactam polymer is crosslinked with N,N-divinylimidazolidone.

* * * * *